US012043209B2

(12) United States Patent
Glässer et al.

(10) Patent No.: US 12,043,209 B2
(45) Date of Patent: Jul. 23, 2024

(54) SEAT BELT RETRACTOR

(71) Applicant: Autoliv Development AB, Vargarda (SE)

(72) Inventors: Antto-Christian Glässer, Hasloh (DE); Markus Hueg, Hamburg (DE); Florian Künzler, Wedel (DE)

(73) Assignee: Autoliv Development AB, Vargarda (SE)

( * ) Notice: Subject to any disclaimer, the term of this patent is extended or adjusted under 35 U.S.C. 154(b) by 616 days.

(21) Appl. No.: 17/292,030

(22) PCT Filed: Oct. 29, 2019

(86) PCT No.: PCT/EP2019/079450
§ 371 (c)(1),
(2) Date: May 7, 2021

(87) PCT Pub. No.: WO2020/094448
PCT Pub. Date: May 14, 2020

(65) Prior Publication Data
US 2021/0394709 A1 Dec. 23, 2021

(30) Foreign Application Priority Data
Nov. 8, 2018 (DE) .......................... 102018127909.4

(51) Int. Cl.
*B60R 22/41* (2006.01)
*B60R 22/46* (2006.01)
*B60R 22/48* (2006.01)

(52) U.S. Cl.
CPC ............. *B60R 22/46* (2013.01); *B60R 22/41* (2013.01); *B60R 22/48* (2013.01)

(58) Field of Classification Search
CPC ......... B60R 22/41; B60R 22/46; B60R 22/48; B60R 22/343
See application file for complete search history.

(56) References Cited

U.S. PATENT DOCUMENTS 4,280,584 A * 7/1981 Makishima ........... B60R 22/343
                                                      242/384
5,388,780 A * 2/1995 Matsuki .................. B60R 22/41
                                                      242/383.1
(Continued)

FOREIGN PATENT DOCUMENTS

DE          2809395 A1    9/1979
DE        19620236 C2    11/1996
(Continued)

*Primary Examiner* — Sang K Kim
(74) *Attorney, Agent, or Firm* — Harness, Dickey & Pierce, P.L.C.; Stephen T. Olson

(57) ABSTRACT

A seat belt retractor, with a belt shaft mounted rotatably in a frame, a blocking device for blocking the belt shaft in an extension direction of the seat belt, a control device having a control disc with a toothing for activating the blocking device, an electric actuator with a first blocking lever, which is spring-loaded into the toothing of the control disc in an engagement direction, an ECL blocking lever which, in a first position, blocks the first blocking lever of the actuator during a first belt band extension in a position in which said blocking lever does not engage in the toothing of the control disc, and an LC blocking lever which, in a first position, blocks the first blocking lever of the actuator when a predetermined belt band extension length is fallen short of in a first position.

6 Claims, 10 Drawing Sheets

(56) References Cited

U.S. PATENT DOCUMENTS

Figure 1:
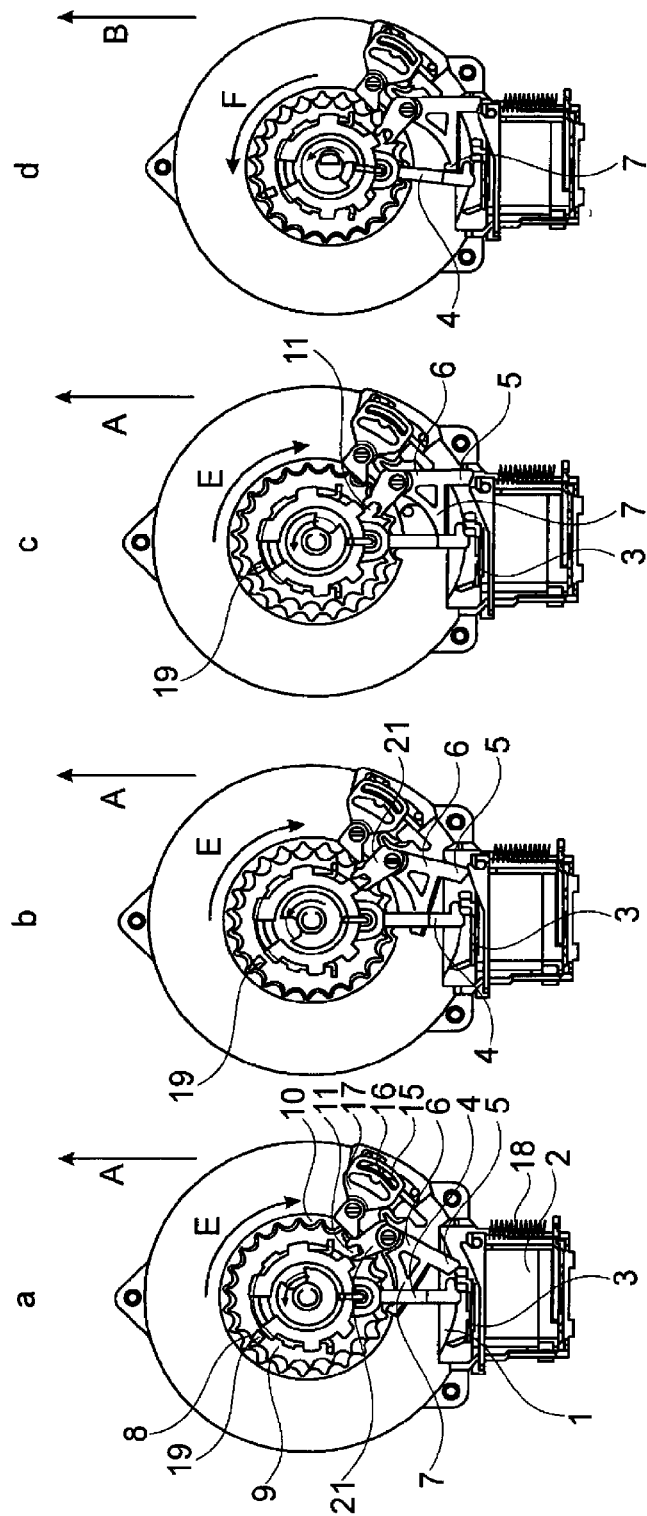

| | | | |
|---|---|---|---|
| 5,505,400 A | * | 4/1996 | Boelstler .............. B60R 22/415 |
| | | | 242/382.2 |
| 5,538,098 A | | 7/1996 | Sparhawk |
| 5,775,620 A | | 7/1998 | Jabusch et al. |

FOREIGN PATENT DOCUMENTS

| | | |
|---|---|---|
| DE | 19602178 C1 | 2/1997 |
| EP | 461602 A1 | 12/1991 |
| GB | 2398824 B | 9/2005 |

* cited by examiner

SEAT BELT RETRACTOR

The present invention relates to a seat belt retractor having the features of the preamble of claim 1.

In principle, seat belt retractors in vehicles are used to wind up a seat belt of a seat belt device of a vehicle. For this purpose, the seat belt retractor has a belt shaft which is spring-loaded in the winding direction and is mounted rotatably in a frame fixed to the vehicle. Moreover, the seat belt retractor has a blocking device for blocking the belt shaft in the belt extension direction, which is activated by means of suitable sensor devices, each of which has a deflectable inertial mass, when predetermined limit values of the vehicle deceleration or belt strap extension acceleration are exceeded. Below the limit values of the vehicle deceleration and the belt strap extension acceleration, the belt shaft can accordingly be rotated counter to the spring loading in the unwinding direction and is automatically driven by the spring loading in the winding direction when the seat belt is unbuckled. The sensor device detecting the vehicle deceleration comprises a deflectable inertial mass with a first blocking lever adjacent thereto, which for its part is deflected when the inertial mass is deflected and engages in an outer toothing of a control disk mounted rotatably on the belt shaft in order to activate the blocking device.

In modern vehicles, there is increasing demand for an electrically activatable blocking device. For this purpose, it is known, for example, from the documents DE 196 20 236 C2 and GB 2 398 824 B to provide an electric actuator with a first blocking lever, which can be controlled by means of an electromagnet and which activates the blocking device in a known manner by being driven into a toothing of a control disk. In this case, the inertial mass is arranged externally, for example in an ECU, and triggers the signal required for activating the actuator by means of an inertia-induced pivoting movement.

In the solution known from DE 196 20 236 C2, the first blocking lever is actively deflected for engagement in the toothing of the control disk when the actuator is energized, and the blocking of the belt shaft is thereby brought about. This solution has the disadvantage that the belt shaft can no longer be actively blocked in the event of a defect in the power supply.

The solution from the applicant's company known from GB 2 398 824 B is based, by contrast, on a different principle. Here, the first blocking lever is spring-loaded in the engagement direction of the toothing of the control disk by means of a spring and is retracted from the engaged position of the toothing by energizing the actuator. In the case of a non-energized actuator and, thus, also in the event of a failure of the power supply, the belt shaft is therefore automatically blocked in the extension direction of the seat belt, and the occupant is restrained in an accident independently of the power supply. In addition to the disadvantage of the continuous energizing of the actuator, this principle additionally has the disadvantage that the occupant cannot buckle before starting the power supply since in this case, the belt shaft is blocked by the first blocking lever engaging in the control disk. In order to avoid this disadvantage, a further blocking lever, which is hereinafter referred to as extraction comfort lever (ECL blocking lever), must therefore additionally be provided in this solution. The ECL blocking lever blocks the first blocking lever of the actuator during the first extension movement of the buckling operation and releases it again after a short retraction movement of the seat belt. The ECL blocking lever was implemented in a belt retractor from the applicant's company as a friction drag lever which is frictionally connected to the belt shaft and thereby forced into a position blocking the first blocking lever of the actuator during the first extension movement of the seat belt. After the belt tongue has been locked, the seat belt is always retracted by a small amount of belt strap length, and the belt shaft is thus rotated in the winding direction. This movement is then used to move the ECL blocking lever back from the position blocking the first blocking lever into a position releasing the first blocking lever. In order for the ECL blocking lever in turn to then not unintentionally block the first blocking lever of the actuator again, a further blocking spring is provided which is moved by means of a first switching device into a position in which it prevents a return movement of the ECL blocking lever into the position blocking the first blocking lever.

Another problem with seat belt retractors is a seat-integrated arrangement in inclination-adjustable backrests, in which the blocking device of the seat belt retractor would be unintentionally activated during an inclination adjustment of the backrest due to the deflection of the first blocking lever. As a result, the belt shaft would be blocked in the extension direction by the activation of the blocking device that is caused thereby, and further adjustment of the backrest is no longer possible due to the blocked belt shaft and the belt strap extension blocked thereby. In order to avoid this problem, the activation of the blocking device by the vehicle-sensitive sensor device must be deliberately deactivated in the position of the non-applied seat belt so that the inclination of the backrest can be adjusted and the backrest can in particular be pivoted forward for entry of the occupants into the rear seats. Such switching off of the vehicle-sensitive sensor device is also referred to at the applicant's company as a "lock canceler" with the abbreviation LC. For this purpose, an LC blocking lever is provided which blocks the first blocking lever of the actuator in a first position when the belt strap is retracted and which is moved by means of a switching device from the first position into a second position that releases the blocking lever starting at a predetermined belt strap extension length.

The object of the invention is to provide a seat belt retractor having an electrically controllable actuator with a first blocking lever which is spring-loaded in the engagement direction of a control disk of a blocking device, an ECL blocking lever blocking the first blocking lever during a first belt strap extension and an LC blocking lever which blocks the first blocking lever in the non-engaged position of the control disk starting at a predetermined belt strap retraction length and which is intended to have a simplified structural form.

In order to achieve the object, a seat belt retractor having the features of claim 1 is proposed. Further preferred developments can be taken from the dependent claims, the figures and the associated description.

According to the basic idea of the invention, it is proposed that the LC blocking lever and/or a carrier plate of the LC blocking lever has/have a blocking contour which is shaped such that the ECL blocking lever comes to rest thereon in a second position which releases the first blocking lever when the LC blocking lever is arranged in the second position.

The advantage of the proposed solution can be seen in the fact that the LC blocking lever is shaped correspondingly to the blocking contour and, by the switching movement which is performed anyway, is brought into a position in which it forms a blocking surface on which the ELC blocking lever comes to rest in a blocking manner after the seat belt has been extended and buckled and the seat belt has been slightly retracted, and there is a reverse rotation of the belt shaft as a result. Thus, the previously provided blocking spring and the associated switching device for blocking the ECL blocking lever can be omitted, and the LC blocking lever is instead used, in its form and with the switching movement forced by the switching device provided in any case, to fix the ECL blocking lever. Since the switching point of the LC blocking lever is at a very small belt strap extension length, the LC blocking lever or the carrier plate with the LC blocking lever and the blocking contour arranged thereon is already moved into the second position after the extension of a very small belt strap extension length, and the ECL blocking lever is thus also then blocked against a repeated blocking of the first blocking lever at a very short belt strap extension length, such as during the buckling of children, after the slight retraction movement.

It is furthermore proposed that the switching device is realized in the form of a counting gear which is coupled to the belt shaft and which controls the movement of the LC blocking lever as a function of the belt strap extension length. Purely mechanical and thus cost-effective control of the LC blocking lever can be realized by the counting gear.

It is furthermore proposed that the counting gear comprises an annular toothing which is driven by the belt shaft and is arranged eccentrically to an annular counter toothing and meshes circumferentially on the counter toothing during the rotation of the belt shaft and thereby drives the counter toothing to a reduced rotational movement. The proposed form of the counting gear enables a compact design of the seat belt retractor, wherein the choice of the reduction can be carried out very simply by dimensioning the teeth of the annular toothing and of the counter toothing as well as the eccentricity of the driven annular toothing.

It is furthermore proposed that at least one trip cam is provided on the counter toothing, which trip cam controls the movement of the LC blocking lever. In the counting gear, the counter toothing executes a reduced rotational movement, by means of which the trip cam arranged thereon executes a circular and possibly also undulating feed movement, which is used for switching the LC blocking lever.

Alternatively, the counting gear may also have a driving drive gear and at least one driven gear meshing with the driving drive gear, wherein the driven gear is arranged on a pivotable rocker with a switching contour, and the drive gear and/or the driven gear has/have at least one trip cam which force/forces a switching movement of the rocker in a predetermined rotational angle position of the drive gear and of the driven gear and thereby control/controls the movement of the LC blocking lever. The movement of the rocker and thus the movement of the LC blocking lever is effected by the mutual pressing of the two gears via the trip cam or cams, wherein the pivoting mobility of the rocker allows the relative movement and thus the switching movement.

It is furthermore proposed that an ALR/ELR switching mechanism is provided, which is controlled by the counting gear as a function of the belt strap extension length. By means of the proposed solution, the already provided counting gear is additionally used for switching an ALR/ELR switching mechanism which is provided for retaining child seats. The seat belt retractor can thus be provided with a further additional function with very little effort.

Figure 2:
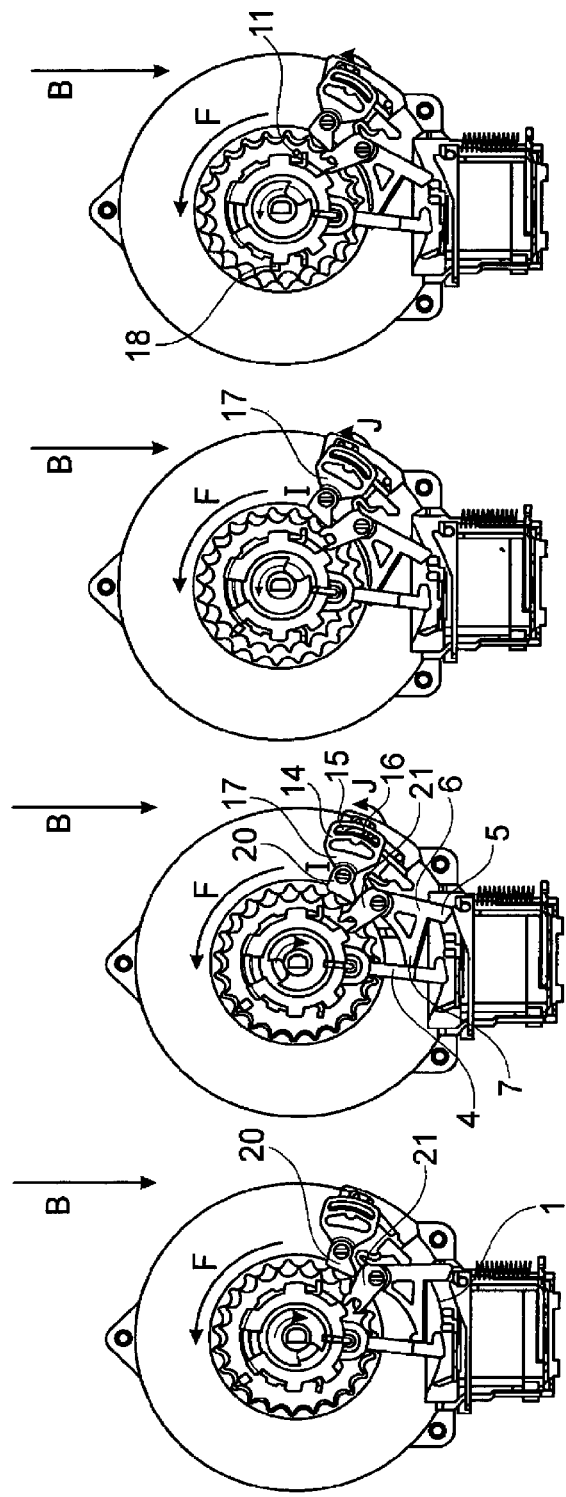
Figure 3:
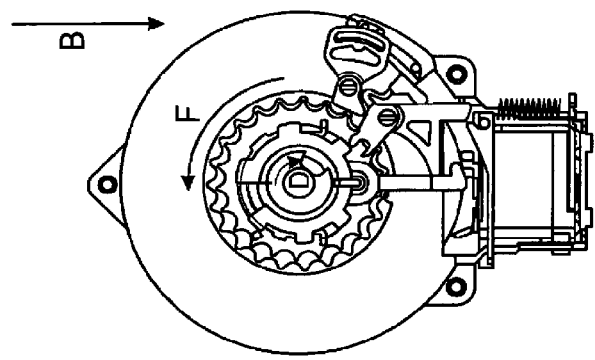
Figure 3:
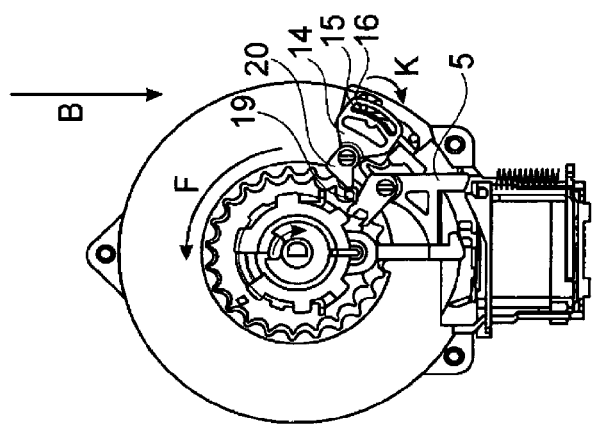
Figure 3:
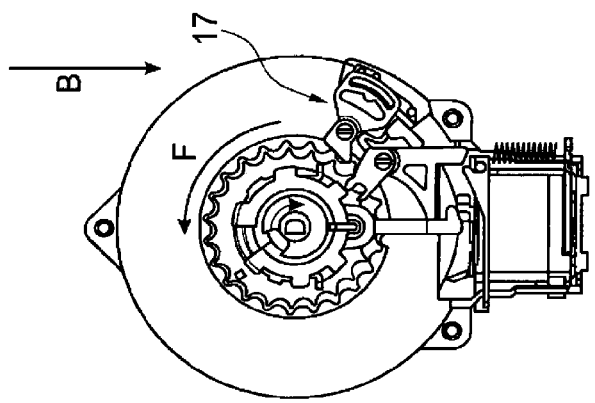
Figure 4:
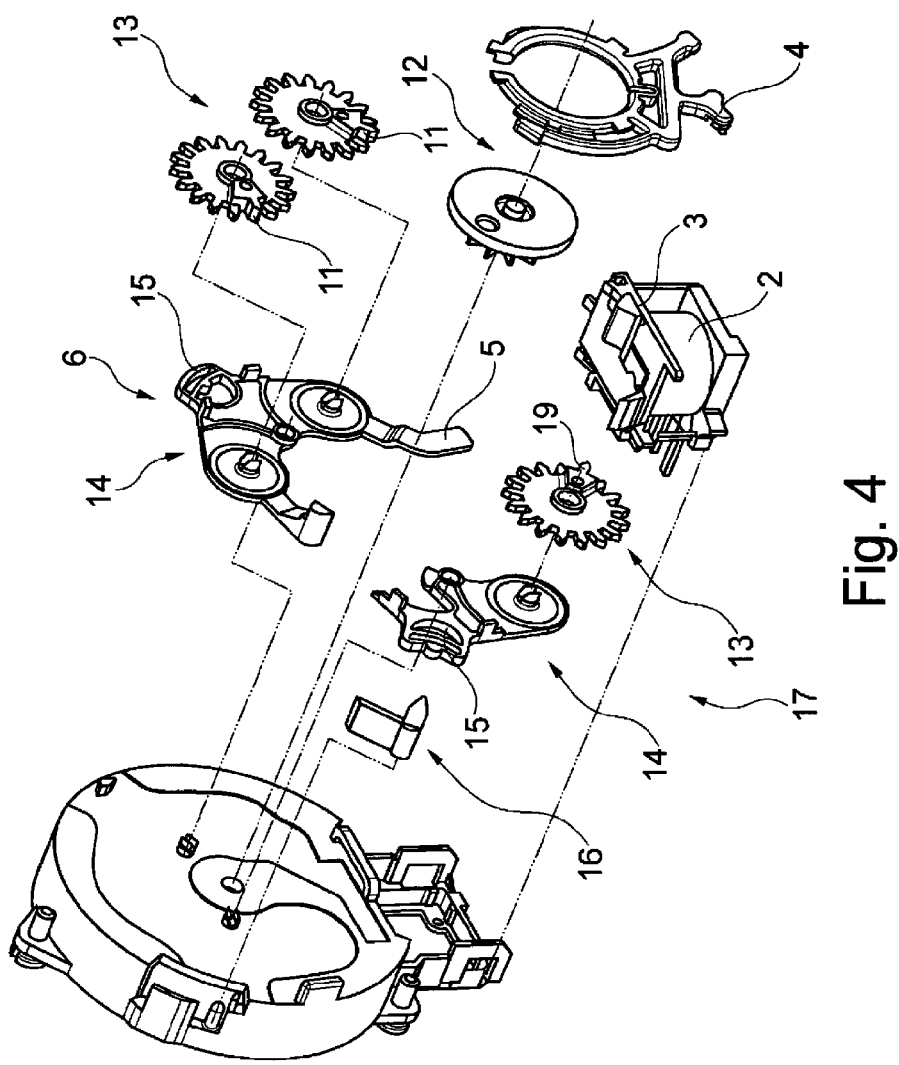
Figure 5:
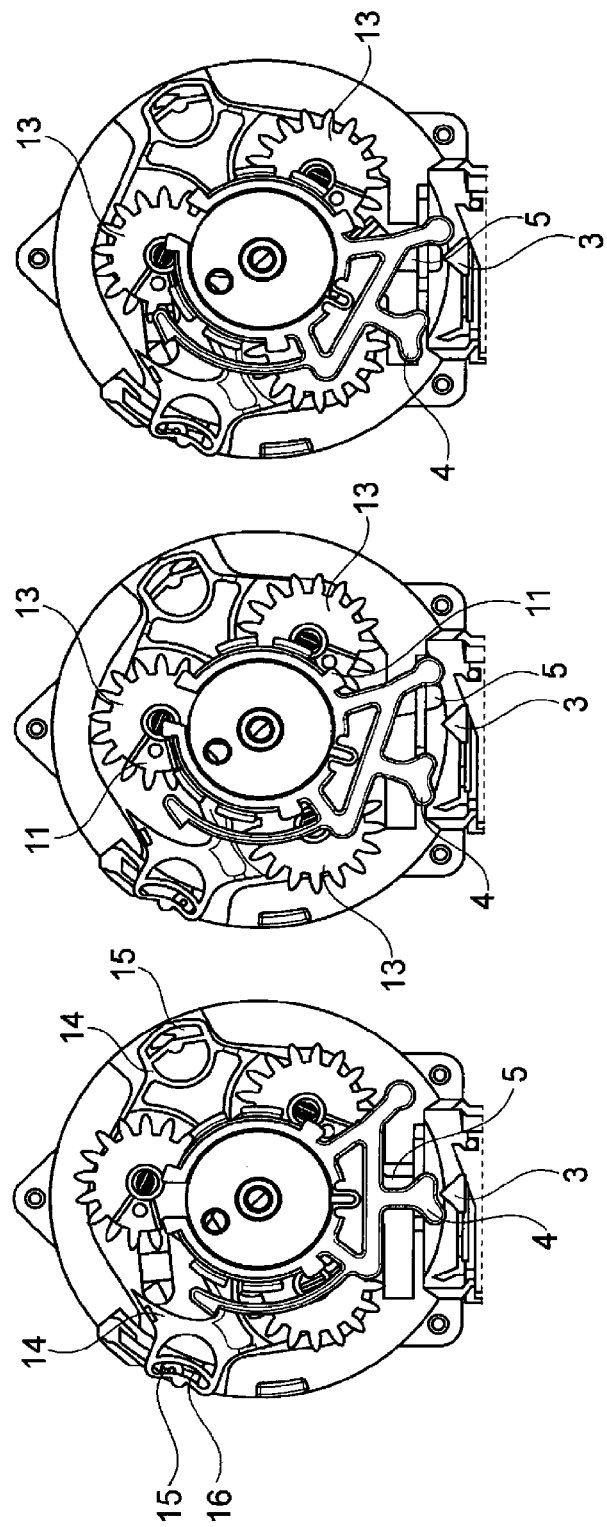
Figure 6:
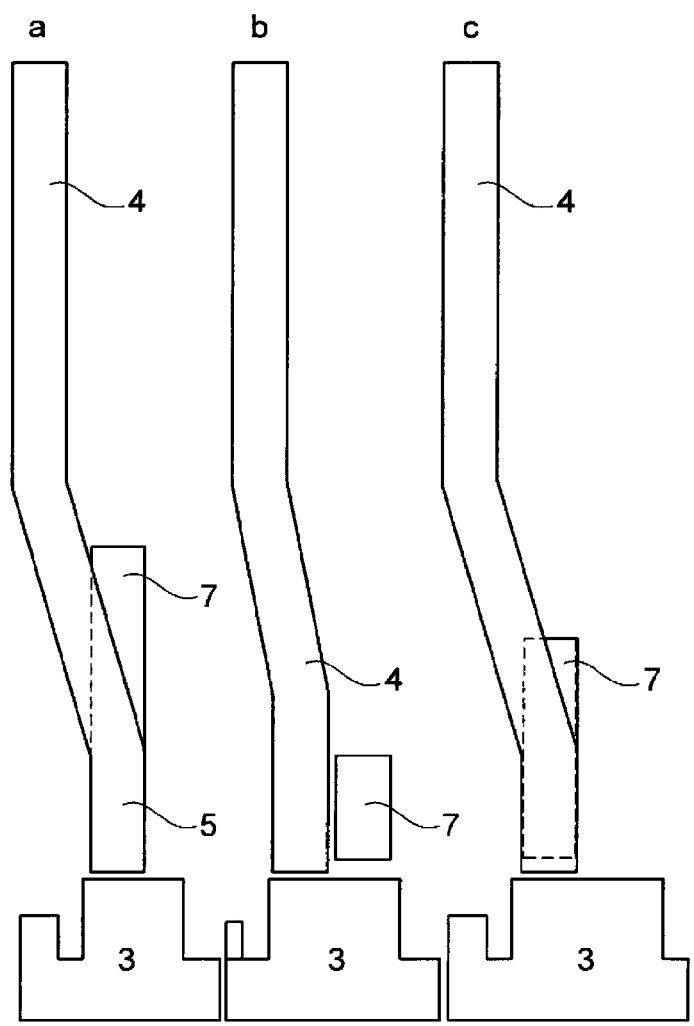
Figure 7:
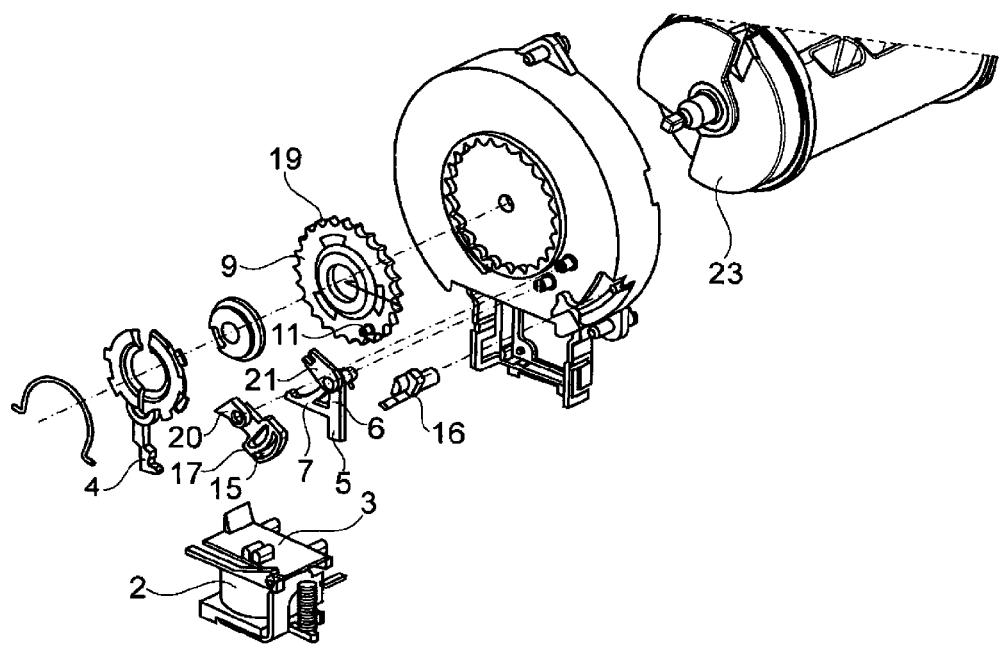
Figure 8:
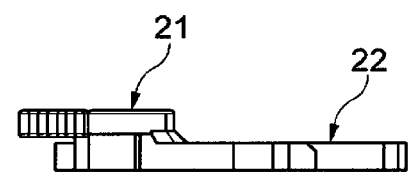
Figure 8:
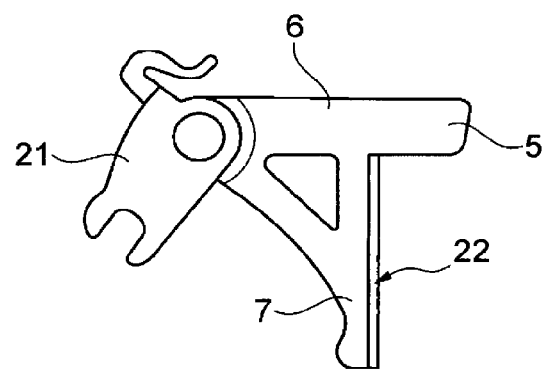
Figure 9:
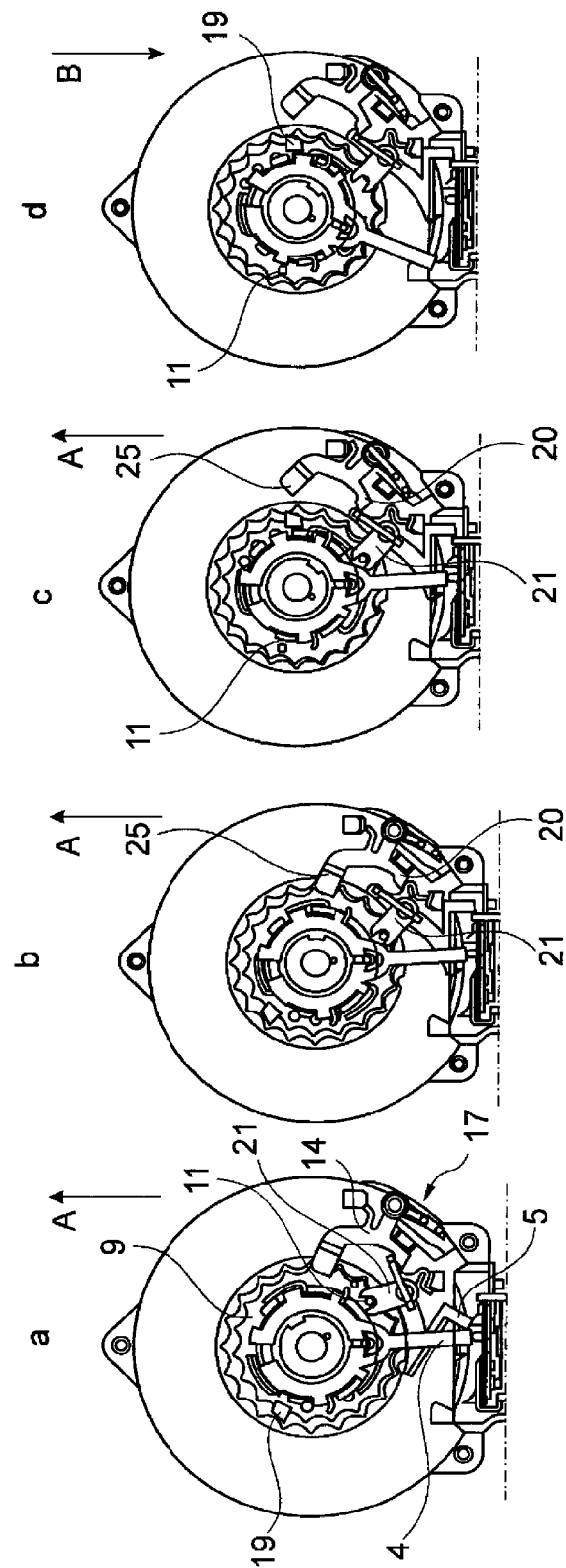
Figure 10:
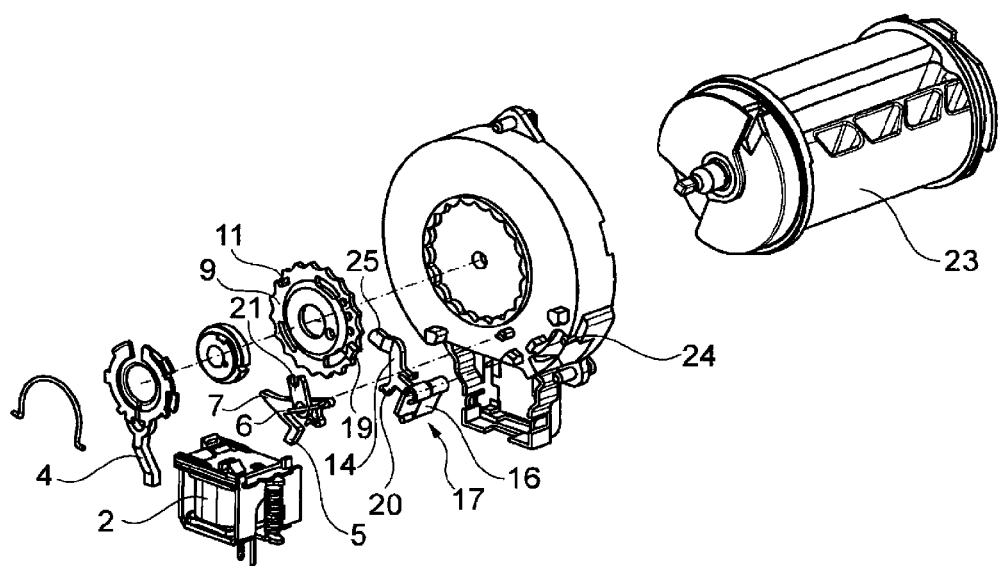

The invention is explained below using preferred embodiments with reference to the accompanying figures. In the drawing:

FIG. 1 shows a seat belt retractor according to the invention in a first embodiment with an ECL blocking lever and an LC blocking lever in various positions during the belt strap extension movement, and FIG. 2 shows the seat belt retractor according to the invention from FIG. 1 with the LC blocking lever in various positions and an ELR/ALR switching mechanism when deactivating the ALR mode during the belt strap retraction movement, and FIG. 3 shows a seat belt retractor according to the invention with an LC blocking lever in various positions and an ELR/ALR switching mechanism when activating the ALR mode, and FIG. 4 shows an exploded view of a seat belt retractor according to the invention in a second exemplary embodiment, and FIG. 5 shows the seat belt retractor according to the invention in the second exemplary embodiment from FIG. 4 with the ECL blocking lever and the LC blocking lever in various positions, and FIG. 6 shows the ECL blocking lever and the blocking contour of the LC blocking lever from FIG. 1 in various positions, and FIG. 7 shows an exploded view of the seat belt retractor according to the invention according to FIGS. 1 to 3, and FIG. 8 shows the LC blocking lever in an enlarged representation in two different views, and FIG. 9 shows an alternative embodiment according to a second exemplary embodiment during different belt strap extension lengths, and FIG. 10 shows an exploded view of the seat belt retractor according to the second exemplary embodiment.

FIG. 1 shows a seat belt retractor according to the invention with a belt shaft 23 which is shown only in FIG. 7 and is mounted rotatably in a frame (not depicted). In addition to the mounting of the belt shaft 23, the frame also serves in a known manner to fix the seat belt retractor to the vehicle. A seat belt can be wound on the belt shaft 23, wherein the extension direction in FIG. 1 is indicated by arrow direction A and the retraction direction in FIGS. 2 and 3 by arrow direction B.

Provided on the belt shaft 23 is a control disk 1 which has on its outer circumference a radially outwardly directed toothing (not depicted), which is spring-loaded in the winding direction of the seat belt relative to the belt shaft and, by executing a rotational movement relative to the belt shaft, forces a blocking device (likewise not depicted) in the form of a blocking pawl mounted on the belt shaft to make an adjusting movement into a frame-mounted toothing. Furthermore, an electric actuator 2 is provided radially on the outside of the seat belt retractor and has a pivotably mounted first blocking lever 3 that is spring-loaded in the engagement direction of the toothing of the control disk 1 by means of a spring 18. The actuator 2 furthermore has an electromagnet, which pivots the first blocking lever 3 out of the engaged position into the toothing during an excitation so that the control disk 1 can freely rotate when the electromagnet is excited and the belt shaft is not blocked. Thus, when the power supply fails, the first blocking lever 3 is automatically pivoted in order to engage in the toothing of the control disk 1, and the belt shaft 23 is thereby blocked in order to restrain the occupants. Since the actuator 2 is not energized before the ignition of the vehicle is switched on due to the lack of power supply, the first blocking lever 3 is pulled by the spring 18 into the toothing of the control disk 2 and the belt shaft 23 would consequently be blocked in the extension direction of the seat belt. In order to prevent this, an extraction comfort lever is provided, which is hereinafter referred to as an ECL blocking lever 4. The ECL blocking lever 4 is realized by a friction drag lever which is frictionally connected directly or indirectly to the belt shaft 23 and is frictionally fixed on a shoulder assigned to the belt shaft 23 via an annular spring and an annular, open projection.

The ECL blocking lever 4 is pivoted counterclockwise by the extension of the seat belt in arrow direction A and the resulting rotation of the belt shaft 23 in arrow direction C and thereby comes to rest on the upper side of the first blocking lever 3 facing the control disk 1. Thus, the first blocking lever 3 of the actuator 2 is blocked against a driving movement into the toothing of the control disk 1 during the first extension movement despite the spring force applied by the spring 18, and the seat belt can be pulled out freely.

Furthermore, an LC blocking lever 5 is provided which extends radially outward from a pivotably mounted carrier plate 6. Furthermore, a blocking contour 7 in the form of a radially protruding finger and a switching lever 21 having a recess are provided on the carrier plate 6. A switching device 8 in the form of a counting gear with an annular toothing 9 and a counter toothing 10 arranged eccentrically to the annular toothing 9 is provided on the belt shaft. During the extension movement of the seat belt, the annular toothing 9 meshes with the counter toothing 10 and executes a clockwise feed movement in arrow direction E. Furthermore, a first trip cam 11 and a second trip cam 19 are provided on the annular toothing 9 of the counting gear.

As can be seen in the left-hand illustration a of FIG. 1, the LC blocking lever 5 in the starting position before the beginning belt strap extension is likewise in a position in which it rests on the upper side of the first blocking lever 3 facing the control disk 1 and thereby blocks the first blocking lever 3 against a driving movement into the toothing of the control disk 1. As a result, the seat belt can be extended and retracted again, for example, in order to adjust the inclination of the backrest. The actuator 2 is practically deactivated. The annular toothing 9 engages with the first trip cam 11 in the recess of the switching lever 21 of the carrier plate 6 of the LC blocking lever 5. Since the annular toothing 9 rotates in arrow direction E during the extension movement of the seat belt, the carrier plate 6 with the LC blocking lever 5 is thereby forced to make a counterclockwise pivoting movement in arrow direction G as a result of the engagement of the first trip cam 11 in the recess of the switching lever 21. This pivoting movement of the carrier plate 6 pivots the LC blocking lever 5 away from the upper side of the first blocking lever 3 into the position of illustration b, and the blocking contour 7 reaches a predetermined position, which is important for the blocking of the ECL blocking lever 4 explained in more detail below.

In the left-hand illustration a of FIG. 1, the seat belt retractor can be seen in the position at the beginning of the extension movement. The LC blocking lever 5 and the ECL blocking lever 4 rest on the upper side of the first blocking lever 3 and thereby deactivate the actuator 2. During the subsequent extension movement of the seat belt, the belt shaft rotates in arrow direction C and thereby forces the ECL blocking lever 4 into the position of illustration c blocking the first blocking lever 3. At the same time, the LC blocking lever 5 is forced counterclockwise in arrow direction G into the position of illustration c releasing the first blocking lever 3. After the occupant has buckled the seat belt, it is always retracted for a small amount back in arrow direction B of the right-hand illustration of FIG. 1, whereby the belt shaft 23 rotates clockwise in arrow direction D and the ECL blocking lever 4 is simultaneously pivoted clockwise. As a result, the ECL blocking lever 4 releases the first blocking lever 3 of the actuator 2, and the actuator 2 can be driven with the tip of the first blocking lever 3 into the toothing of the control disk 1 when there is a corresponding signal for blocking the belt shaft 23. Furthermore, the ECL blocking lever 4 thereby reaches a position in which it rests on the end face of the blocking contour 7 of the LC blocking lever 5 or of the carrier plate 6 assigned thereto and is thereby blocked against a reverse rotational movement into the position blocking the first blocking lever 3. This position can be seen in the right-hand illustration d. The blocking of the ECL blocking lever 4 is thus effected by the LC blocking lever 5 together with the blocking contour 7 arranged on the carrier plate 6, wherein the preceding movement of the LC blocking lever 5 is deliberately utilized in order to bring the blocking contour 7 into a predetermined position on which the ECL blocking lever 4 then comes to rest in a blocking manner by the retraction movement of the seat belt. Since the LC blocking lever 5, due to its function of blocking the actuator 2 when the seat belt is retracted, is moved in any case from the blocking position to the position releasing the first blocking lever 3 after a predetermined belt strap extension length, this movement can simultaneously be used by the solution according to the invention for realizing or for providing the blocking contour 7 for the ECL blocking lever 4 in the predetermined position after the belt strap extension has taken place.

In addition, the operation of an ALR/ELR switching mechanism 17 provided on the seat belt retractor is depicted in more detail in the illustrations of FIG. 2. The ALR/ELR switching mechanism 17 comprises a rocker 14 with a switching contour 15 in which an ALR blocking lever 16 engages with a protruding pin. In the left-hand illustration, the ALR blocking lever 16 is in engagement with the toothing of the control disk 1 and thereby leads to an automatic blocking of the belt shaft 23 in the extension direction if a tensile force is applied via the seat belt. Furthermore, a switching lever 20 is provided on the rocker 14 and comes to rest on the switching lever 21 of the carrier plate 6 of the LC blocking lever 5 due to the belt strap retraction movement and the movement of the counting gear caused thereby. During the further retraction movement, the switching lever 21 of the carrier plate 6 carries out a pivoting movement in arrow direction H and thereby forces a pivoting movement of the switching lever 20 of the ALR/ELR switching mechanism 17 in arrow direction I. As a result of the pivoting movement of the rocker 14 forced thereby, likewise in arrow direction I, the ALR blocking lever 16 is forced by the pin engaging in the switching contour 15 to make a pivoting movement in arrow direction J out of the toothing of control disk 1, and the control disk 1 can subsequently rotate freely in the extension direction together with the belt shaft.

FIG. 3 shows the reverse movement sequence of the ALR/ELR switching mechanism 17, in which the switching lever 20 of the rocker 14 is forced to make a pivoting movement in arrow direction L by the second trip cam 19 of the annular toothing 9 sliding on the end face. At the same time, the ALR blocking lever 16 is thereby forced to make a pivoting movement in arrow direction K in the engagement direction into the toothing of the control disk 1.

FIGS. 4 and 5 show a seat belt retractor according to the invention with an alternative embodiment of the counting gear. The counting gear comprises a drive gear 12 and three driven gears 13 meshing with the drive gear 12. The driven gears 13 each have a trip cam 11, 19 and are arranged on two different rockers 14, each having a switching contour 15. In this case, the switching movement of the rockers 14 is triggered by the trip cams 11 and 19 coming into contact with a counter contour, such as a void of a counter toothing.

FIG. 6 shows the position of the ECL blocking lever 4 and of the LC blocking lever 5 with the blocking contour 7 in a view from the side in the positions a, c and d relative to one another and to the first blocking lever 3 of the actuator 2. In the left-hand illustration a, the ECL blocking lever 4 and the LC blocking lever 5 are in a position blocking the first blocking lever by resting on the upper side of the first blocking lever 3 and thereby preventing its pivoting movement into the toothing of the control disk 1. During the further extension movement of the seat belt strap, the LC blocking lever 5 is pivoted and thereby moves under an elastic lateral deformation of the ECL blocking lever 4 into a position in which it laterally overlaps the ECL blocking lever 4 with the blocking contour 7 and comes to rest behind the ECL blocking lever 4 in illustration c of FIG. 1. The LC blocking lever 5 is thus located with the blocking contour 7 in a type of standby position for blocking the ECL blocking lever 4. If the seat belt is subsequently retracted again by a small amount of belt length, the ECL blocking lever 4 rotates and, due to its elastic deformation, latches automatically on the end face of the blocking contour 7 of the LC blocking lever 5 into the position of illustration d. As a result, the ECL blocking lever 4 is then blocked against a reverse rotational movement into the position blocking the first blocking lever 3.

The ECL blocking lever 4 and the LC blocking lever 5 are shaped in such a way that in the position blocking the first blocking lever 3, the blocking contour 7 is to the side of the ECL blocking lever 4 without one of the blocking levers 4 or 5 being elastically deformed. For this purpose, the ECL blocking lever 4 has a slight offset or else a small step, which allows an overlapping arrangement without elastic deformation. The blocking contour 7 is then pivoted downward in the direction of the first blocking lever 3 only during the extension movement of the seat belt and thereby displaces the ECL blocking lever 4 because of the step or the offset. The ECL blocking lever 4 is thereby practically elastically preloaded. This elastic preloading then becomes the automatic blocking movement of the ECL blocking lever 4 during the pivoting movement of the ECL blocking lever 4.

FIG. 8 shows the LC blocking lever 5 in an enlarged representation in two different perspectives. The LC blocking lever 5 laterally has a stage 22 on the finger acting as blocking contour 7, which stage simplifies the relative movement to the ECL blocking lever 4 by allowing the LC blocking lever 5 to slide with the blocking contour 7 on the ECL blocking lever 4.

FIGS. 9 and 10 show a seat belt retractor according to a second exemplary embodiment of the invention. The ECL blocking lever 4 is here likewise a friction drag lever which is fixed via an annular spring on an open shoulder of the belt shaft 23 and thereby carries out the movements of the belt shaft 23 with friction until the frictional force is exceeded.

The exemplary embodiment of FIGS. 9 and 10 differs in the shape of the LC blocking lever 5 and the ALR/ELR switching mechanism 17. The LC blocking lever 5 is in this case likewise formed by a pivotable carrier plate 6 with a blocking contour 7 in the form of a laterally protruding arm. The movement of the LC blocking lever 5 is likewise controlled via an annular toothing 9 driven to rotate with a trip cam 11 provided thereon. The ALR/ELR switching mechanism 17 also comprises a rocker 14 with a projecting arm 25 which interacts with the ALR blocking lever 16 which is pivotably mounted on a pin 24. The movement of the rocker 14 for switching from the ELR operation to the ALR operation, the position of which is shown in illustrations c and d of FIG. 9, is controlled by the sliding of the control cam 19 on the projecting arm 15 of the rocker 14. This movement causes the rocker 14 with the ALR blocking lever 16 to engage in the toothing of the control disk 1 and with the switching lever 20 to rest on a projection of the switching lever 21 of the LC blocking lever 5. If the belt strap is then retracted again from this position until the trip cam 11 passes the blocking lever 21, the trip cam 11 forces the blocking lever 21 to make a pivoting movement out of the position of illustration d into the position of illustration a. Since the blocking lever 21 simultaneously rests via the projection on the rocker 14, the rocker 15, and as a result also the ALR blocking lever 16, is also forced to make a pivoting movement, by which the ALR blocking lever 16 disengages from the toothing of the control disk 1. The belt retractor is thereby switched from ALR operation to ELR operation.

The invention claimed is:

1. A seat belt retractor comprising
a belt shaft which is mounted rotatably in a frame and on which a seat belt can be wound, and
a blocking device for blocking the belt shaft in the extension direction of the seat belt, and
a control device having a control disk with a toothing for activating the blocking device, and
an electric actuator having a first blocking lever spring-loaded into the toothing of the control disk in the engagement direction, and
an ECL blocking lever which, in a first position, blocks the first blocking lever of the actuator during a first belt strap extension in a position in which it does not engage in the toothing of the control disk, and
an LC blocking lever, which, in a first position when the belt strap extension length falls short of a predetermined length, blocks the first blocking lever of the actuator in a first position in which it does not engage in the toothing of the control disk and, when the belt strap extension length exceeds the predetermined length, is moved by means of a switching device into a second position in which it does not block the first blocking lever, wherein
the LC blocking lever and/or a carrier plate of the LC blocking lever have a blocking contour which is shaped in such a way that the ECL blocking lever comes to rest thereon in a second position releasing the first blocking lever when the LC blocking lever is arranged in the second position.

2. The seat belt retractor according to claim 1, wherein the switching device is realized in the form of a counting gear which is coupled to the belt shaft and which controls the movement of the LC blocking lever as a function of the belt strap extension length.

3. The seat belt retractor according to claim 2, wherein the counting gear comprises an annular toothing which is driven by the belt shaft and is arranged eccentrically to an annular counter toothing and meshes circumferentially on the counter toothing during the rotation of the belt shaft and thereby drives the counter toothing to a reduced rotational movement.

4. The seat belt retractor according to claim 3, wherein at least one trip cam, which controls the movement of the LC blocking lever, is provided on the counter toothing.

5. The seat belt retractor according to claim 2, wherein the counting gear has a driving drive gear and at least one driven gear meshing with the driving drive gear, wherein
the driven gear is arranged on a pivotable rocker with a switching contour, and the drive gear and/or the driven gear have at least one trip cam which, in a predetermined rotational angle position of the drive gear and of the driven gear, force/forces a switching movement of the rocker and thereby control/controls the movement of the LC blocking lever.

6. The seat belt retractor according to claim 2, wherein an ALR/ELR switching mechanism is provided which is controlled by the counting gear as a function of the belt strap extension length.

\* \* \* \* \*